Patented Feb. 15, 1927.

1,618,102

UNITED STATES PATENT OFFICE.

JACQUE C. MORRELL, OF OAK PARK, ILLINOIS.

PROCESS OF MAKING COVERING MATERIAL.

No Drawing. Application filed October 11, 1923. Serial No. 668,036.

This invention relates to covering materials, and refers more particularly to the preparation of linoleum or oil cloth-like products which are preferably of a waterproof nature. The invention lies particularly in the manufacturing of such products by utilizing an aqueous vehicle or medium for suspending the pigments, fillers and emulsified binders in place of the expensive solvents heretofore used. As a rule, in the manufacture of linoleums a linoleum cement is first made. The blown linseed oil or vegetable oil is melted with various gums and gum resins usually kauri gum and rosin. This is mixed with cork flour and various pigments and fillers. By means of the present invention, all of these materials, that is, the gums, resins, bitumens or like substances may be suspended in an aqueous medium, and a vegetable oil such as the raw or blown linseed is emulsified and added to the suspension. The pigments and fillers are then added to the mixture and subsequent filtration or removal of excess water results in a substance which may be spread on canvas or other fabric, where it is dried, producing a linoleum-like product substantially identical to that made with the linoleum cement above described.

In making the linoleum cement, the material must be made up in small batches in steam heated vessels, while the present invention allows the preparation of large quantities prepared in a cold state and applied to the canvas backing or fabric while cold. The linoleum made by the present invention can be subjected to the same seasoning processes as have heretofore been used, and may be worked up into the various patterns and designs.

Suspensions of wood flour and other cellulose-like materials may be added to the cork, or can be used to replace the cork as a filling material. Other fibrous or granular materials of a vegetable or animal origin may be used as substitutes for the cork and wood mentioned above.

Oil cloth consisting of fabrics coated with linseed oil, whiting and pigments can also be made using the principles of the above process. Various driers such as litharge and metallic resinates are sometimes used in this connection.

In addition to the coating of fabrics with linseed oil, suspensions of other organic materials may be used such as bitumens, asphalts, pitches and also emulsions of rubber solutions. It is to be particularly pointed out that in all cases valuable solvents in some cases dangerous to store and use are replaced by water as a vehicle. Further, the process of making the raw material and applying is a cold process, thus avoiding the extra expense of heating, as well as the inconvenience of applying heat under certain circumstances. The particular method used in forming the mixture utilized in the manufacture of these covering materials such as linoleum, oil cloth and coated fabrics, that is, the method of producing a suspension of non-fluid organic material and combining the same with an emulsion of oleaginous substances together with the protective colloid used in connection with this combination, are described in detail in my Patents Nos. 1,440,355 and 1,440,356 issued December 26th, 1922.

The present invention has to do with the utilization of this combining of a non-fluid semi-solid organic material in a liquid containing a protectve colloid with an emulsion of an oil or other organic liquid in water containing a protective colloid as applied to a certain industry, namely the manufacture of covering materials such as linoleum, oil cloths and coated fabrics hereinbefore mentioned.

The emulsion containing the water, protective colloid and oil or other organic liquid, may have the water either in the dispersed phase of the emulsion, or in the continuous phase of the emulsion, the final product having like characteristics, according to the method of combining liquids, and the particular type of liquids used.

As an illustration of this, the addition of naphthalene or other coal tar products, to a petroleum or other oils, will favor the formation of an emulsion with the oil in the internal phase, and will also facilitate the formation of such emulsion, while the addition of rosin and like substances may favor the formation of an emulsion with oil in the external phase.

I claim as my invention:

1. A process of producing a covering material comprising first making a mixture of suspensions of organic materials with emulsions of oleaginous substances and filler materials, and applying this mixture in the form of a coating upon a backing material.

2. A process of producing a covering material comprising first making a mixture of suspensions of organic materials with emulsions of oleaginous substances, pigment and filler materials, and applying this mixture in the form of a coating upon a fabric backing.

JACQUE C. MORRELL.